United States Patent [19]

Herczfeld

[11] Patent Number: 4,814,774
[45] Date of Patent: Mar. 21, 1989

[54] OPTICALLY CONTROLLED PHASED ARRAY SYSTEM AND METHOD

[76] Inventor: Peter R. Herczfeld, 7105 Greene St., Philadelphia, Pa. 19119

[21] Appl. No.: 904,195

[22] Filed: Sep. 5, 1986

[51] Int. Cl.$^4$ .............................................. H01Q 3/36
[52] U.S. Cl. ................................ 342/372; 342/375; 342/368
[58] Field of Search ............... 342/375, 372, 368, 108, 342/377; 455/612; 350/96.13

[56] References Cited

U.S. PATENT DOCUMENTS

| | | | |
|---|---|---|---|
| 4,028,702 | 6/1977 | Levine | 342/374 |
| 4,238,797 | 12/1980 | Shreve | 342/377 |
| 4,241,351 | 12/1980 | Shreve | 342/368 |
| 4,271,413 | 6/1981 | Shreve | 342/377 |
| 4,507,662 | 3/1985 | Rothenberg et al. | 312/376 |
| 4,529,986 | 7/1985 | d'Auria et al. | 342/372 |
| 4,583,096 | 4/1986 | Bellmon et al. | 342/368 |
| 4,620,193 | 10/1986 | Heeks | 342/368 |

OTHER PUBLICATIONS

Arnold M. Levine, Use of Fiber Optic Frequency and Phase Determining Elements in Radar 5/30/79 pp. 437–440.

Primary Examiner—Theodore M. Blum
Assistant Examiner—Mark Hellner
Attorney, Agent, or Firm—Woodcock Washburn Kurtz Mackiewicz & Norris

[57] ABSTRACT

An optically controlled phased array antenna system and method of operating same utilizing fiber optic transmission lengths and controlled piezo-electric crystals or equivalent elements to introduce predetermined time delays into each light signal by controlling the respective length of each fiber optic link. The light carrying fibers are wrapped around the respective crystals in accordance with a pattern to introduce time delays corresponding to the amount of stretch given to the fiber by the energized crystals. Beam scanning is achieved by controlling the matrix of crystals to introduce appropriate time delays into the optical signals which drive the respective antenna elements.

19 Claims, 2 Drawing Sheets

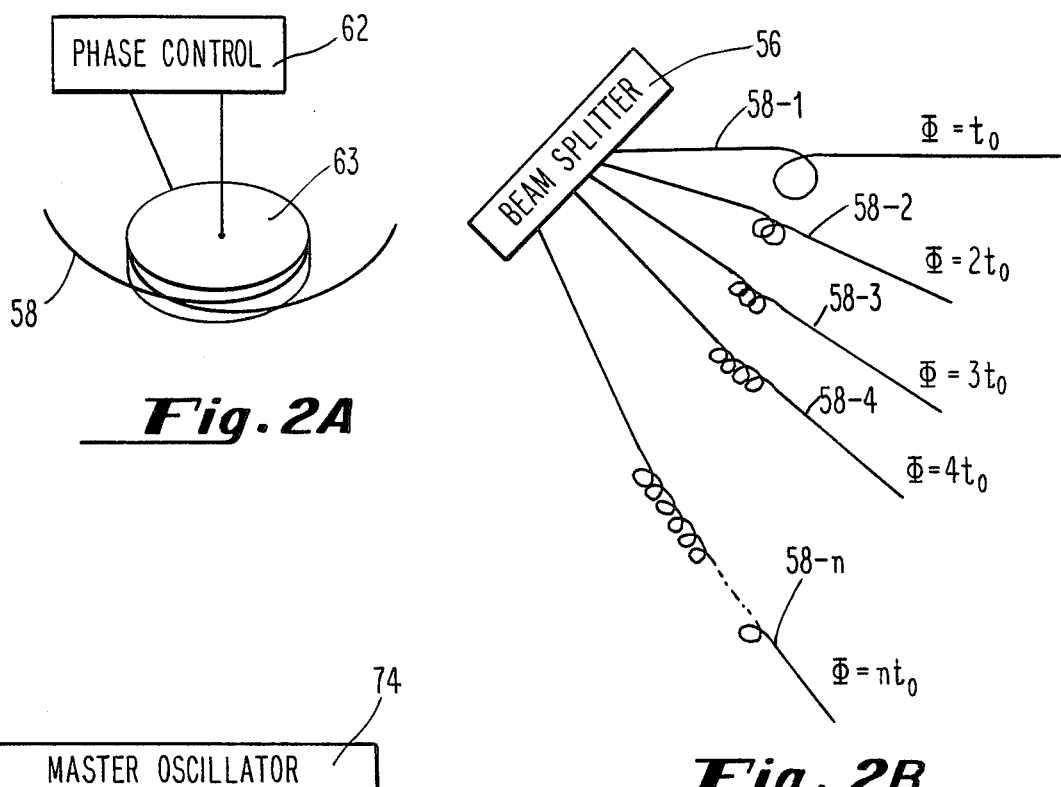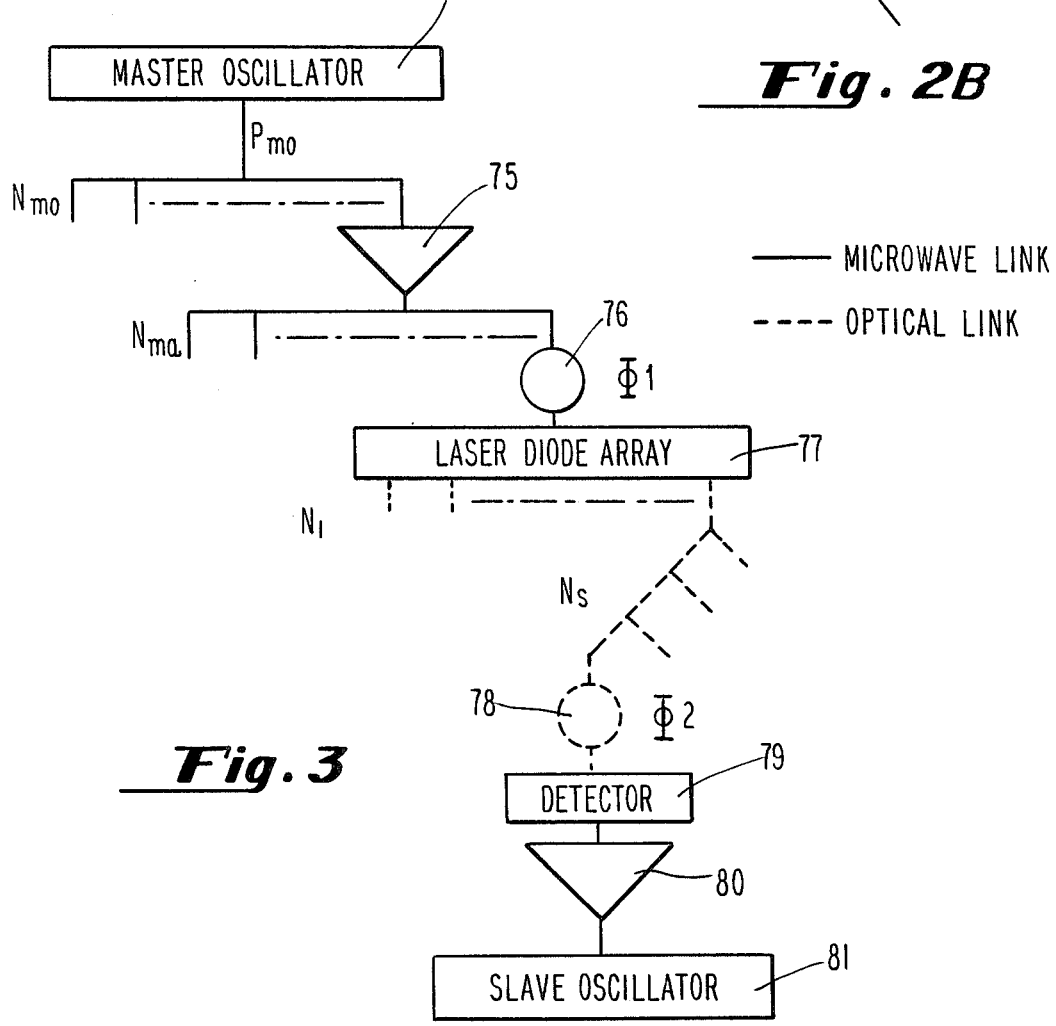

OPTICALLY CONTROLLED PHASED ARRAY SYSTEM AND METHOD

FIELD OF THE INVENTION

This invention relates to phased array antennas and, in particular, phased array systems utilizing fiber optic distribution networks and means for introducing beam control.

BACKGROUND OF THE INVENTION

Phased array antenna systems play a highly important role in many areas, and indeed an increasingly important role in military and space applications. They are extensibly utilized in communications, surveilance and guidance systems. With the trend toward higher frequencies and the use of a large number of monolithic microwave and millimeter circuit components, the available space for signal distribution becomes a serious problem in many applications. For example, against this background the use of fiber optic cables or links to distribute the multitude of control signals represents an advantageous alternative to the use of conventional coaxial cables, waveguide structures or the like. Further, the use of optical links also provides an opportunity to utilize a novel beam steering technique as set forth in the description of this invention. Fiber optic lengths are also advantageous because of their relative immunity to interference (EMI and EMP), their excellent crosstalk isolation, and their small size and weight.

The concept of an optically controlled phased array antenna is known in the communications field. Such a system consists basically of fiber optical distribution feed system and an optical processing system responsible for the beam steering or scanning. The antenna array typically consists of up to 10,000 or more independent distributed transmit/receive (T/R) modules fabricated by monolithic microwave or millimeter wave techniques (MMIC). The main function of the fiber optic distribution system is to transmit the control signals for frequency and phase reference for synchronization of the T/R modules and to achieve the desired beam scanning. The replacement of coaxial cables or waveguides by the fiber optic network also provides a larger band width and smaller transmission losses compared to conventional systems, particularly at higher frequencies.

The problem of beam scanning is one that has received a great deal of attention in the prior art, but due to its complexity and the high frequencies involved it remains a threshold area where great improvement is desired. One of the features of this invention is the utilization of the properties of optical fibers for introducing phase delays in a controlled pattern so as to achieve desired beam steering. It is known in the prior art that optical fibers can be repeatedly stretched by up to about 7% of their length. This characteristic is utilized in this invention as a means of introducing controlled phase delays into the optical lengths. It is noted that researchers working with fiber optic sensors have used piezoelectric crystals to stretch fibers to balance the arms of interferometers K. In this invention, the use of piezoelectric crystals or equivalent electro-mechanical means is made to stretch the fibers and deliberately introduce time delays into the overall system, as discussed in detail hereinbelow.

SUMMARY OF THE INVENTION

It is an object of this invention to provide an improved optically controlled phased array antenna system and method which utilizes the advantages of fiber optic lengths both for signal transmission and for introducing desired true time delays.

It is another object of this invention to provide an improved phase array system which saves space and provides improved beam steering control capability at high frequencies by utilization of fiber optic lengths and piezo-electric or equivalent control elements.

In accordance with the above objects, there is provided an improved optically controlled phased array antenna system and method wherein predetermined time delays are introduced into the signal delivered to each antenna element by stretching the fiber optic link which feeds such element, the stretching being done with a controlled electro-mechanical element such as a piezo-electric crystal. A control potential is applied to each respective piezo-electric crystal to generate respective time delays for producing beam steering in accordance with a predetermined pattern.

BRIEF DESCRIPTION OF THE DRAWINGS

FIG. 2A is a schematic illustrating the manner of stretching an optical fiber to increase its length and thereby introduce an added time delay.

FIG. 2B is a schematic indicating an array of optical fibers each connecting the master oscillator with a T/R module and wrapped around a controlled piezo-electric crystal so as to introduce a predetermined pattern of time delays.

FIG. 3 is a block diagram of a cascaded system in accordance with this invention.

DESCRIPTION OF THE PREFERRED EMBODIMENTS

Figure 1A:
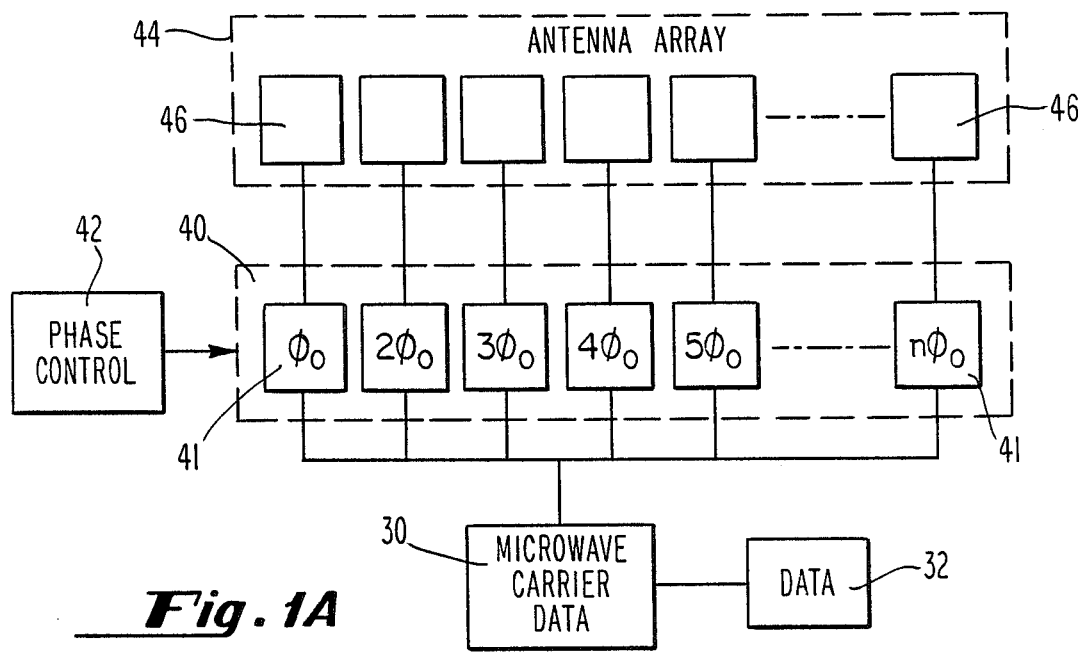
FIG. 1 is a simplified block diagram showing the primary components of a conventional phased array antenna system.
FIG. 1B is a simplified block diagram showing the primary components of an optically controlled phased array system.

Referring now to FIG. 1, a typical phased array antenna system comprises a generator 30 for producing a microwave carrier which carries data inputted thereon from a data source 32, in accordance with well-known techniques. The carrier is introduced into an array 40 of phase shift elements 41, each controlled by a phase control system 42 in accordance with well known techniques. As known, for beam steering, at any given time a linearly varying phase delay is introduced into the respective different multiple elements, where phase shift $\phi_o$ determines the direction of wave propagation. The relative magnitude of the phase shifts for the different elements maintains a predetermined pattern, i.e., each delay is some respective multiple of the base delay. If the value of the base delay is varied, then the beam is steered to a different direction as is known in the art. As the time delays vary continuously, beam scanning is achieved. As is well-known, the relative magnitude of the phase shifts for the different elements must maintain the same pattern of phase delays in order to produce proper scanning of the beam. The respective phase delayed signals are fed into separate antenna elements 46 of antenna array 44, thereby producing the desired beam.

Figure 1B:
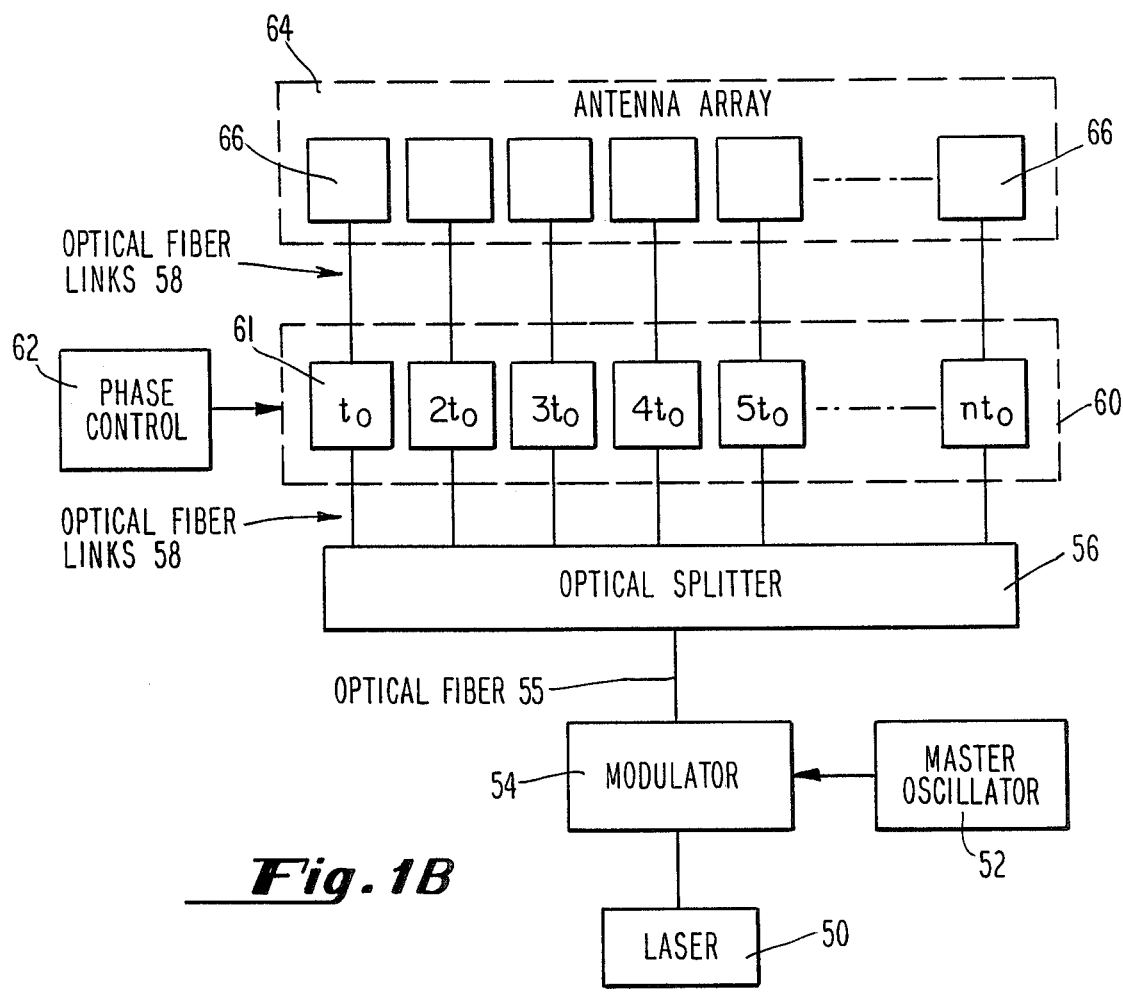

Referring now to FIG. 1B, there is illustrated an optically controlled phased array system. The optical carrier generator suitably comprises a laser as illustrated in 50. A master oscillator 52 produces a synchronizing microwave control signal which is fed into modulator 54, producing a modulated light output which is coupled to optical fiber 55 for rather suitable light coupling means. Thus, the microwave signal is carried on the light beam in the form of amplitude modulations. The light beam is split at 56, and respective light signals are transmitted on respective optical fiber at lengths 58 to the phase array 60. Phase array 60 comprises a plurality of optical true time delay elements 61, each controlled by a phase control system 62. The time delayed optical signals are transmitted across the continuing optical fiber lengths 58 to respective antenna elements of antenna array 64. In practice, there are several different procedures which can be utilized for coupling the optical signal into the antenna or T/R elements 66. This can be accomplished by "direct optical injection locking" where the optical signal is injected into the active element of the slave oscillator of the T/R, which may be an FET or IMPATT diode. Alternately, the "indirect" optical injection locking approach may be utilized, which uses the inherent non-linearities of the semi-conductor laser and the microwave oscillators. In this procedure, the optical signal is coupled to a fiber optic cable or link, and detected and demodulated by a high speed PIN diode which forms part of the T/R element 66. The output of the PIN is filtered, amplified and electrically injected into the FET or IMPATT oscillator. These coupling or locking techniques are known in the literature.

Referring now to FIG. 2A, there is shown the novel means of introducing a time delay into the signal that is being carried on the optic fiber or link 58. As illustrated, the fiber is wrapped once around a substantially disk-shaped piezo-electric crystal 63. The circumference of the crystal is controlled by the voltage applied to the crystal by phase control circuits 62. Since relative expansion of the crystal lengthens or stretches the fiber, the additional length introduces an additional time of transmission and thus a phase delay. It is clear that the amount of stretching and consequent phase delay is a function of the circumference of the piezo-electric crystal, the control voltage applied and also the number of times the fiber is wrapped around the crystal circumference. Thus, for a given phase control signal, the delay introduced would be proportional to the number of turns of the fiber around the crystal circumference. As illustrated in FIG. 2B, a series of fibers 58-1 through 58-N are illustrated, each having n-loops around a crystal of substantially identical circumferences, and each crystal being driven by the same control voltage, as illustrated at the phase introduced in each respective line is n times $t_O$ where n represents the number of turns of the fiber around the crystal.

It is noted that equivalent elements, e.g., magneto-restrictive elements, which are operatively equivalent to piezo-electric crystals may be used for generating the time delays in the fiber optic links. Any electromechanical element that can be combined with the fiber optic link that is suitable to provide a mechanically operative relationship may be used. Thus, any such electro-mechanical element can be used where electrical control of the element provides a mechanical change in the length of the fiber, in the same conceptual manner as illustrated with the example of the piezo-electric crystal.

It is noted that the amount of stretching required to introduce a phase delay is of the order of the wavelength of the microwave signal, ranging in the millimeter and centimeter range for millimeter and microwave systems respectively. The total length of the fiber wrapped around the piezo-electric crystal is of the order of 10 mm or less. Because of the significant difference in Young's modulus between the fiber and the piezo-electric materials, and because of the small cross-section of the fiber, the power requirements to operate the time delays can be relatively modest.

The cascaded system of FIG. 3 illustrates a more complex system. This is a cascaded system in which the output of the master oscillator 74 and then amplified at respective amplifiers 75. The output of each amplifier is given a first gross phase delay at 76, and introduced into a laser diode array 77. Each of the n-diodes of array 77 is split into a plurality of light signals, each of which is passed through a variably controlled delay 78 in accordance with the above discussion of the crystal-fiber optic arrangement. The delayed light signal from delay 78 is optically connected to the T/R element, which comprises a detector 79, amplifier 80 and slave oscillator 81.

I claim:

1. An optically controlled phased array system, comprising:
   light source means for generating at least one light beam carrying a microwave signal;
   optical splitting means for splitting aids at least one light beam into a plurality of light beams, and first optical connecting means for connecting said light beam to said optical splitting means;
   a plurality of T/R modules positioned in a predetermined array, each said module having means for receiving a light inputted thereto and for transmitting a microwave signal corresponding to such inputted light, the sum of said microwave signals constituting a beam;
   fiber optic means for providing a respective fiber optic link connecting each of said plurality of light beams to a respective T/R module;
   true time delay phase shift means introduced in each said fiber optic link for controllably shifting the phase of the microwave signal transmitted on said link, each said phase shift means comprising an electromechanical element having an expandable surface in a mechanically operative relation with the fiber optic link whereby the length of said fiber optic link is a function of the controlled surface size of said element; and
   phase shift control means for electrically driving each of said elements in a predetermined relationship so as to introduce a predetermined time delay phase shift in each said link and thereby steer said beam.

2. The system as described in claim 1, wherein said electro-mechanical element is a piezo-electrical crystal.

3. The system as described in claim 1, wherein said first optical connecting means comprises a fiber optic link.

4. The system as described in claim 1, wherein said light source means comprises a master oscillator, at least one laser, and modulating means for modulating the output of said at least one laser with the signal of said master oscillator.

5. The system as described in claim 1, wherein said light source means comprises a plurality of lasers, each of said lasers in turn coupled to the combination of an optical splitting means, fiber optic means for transmitting the split light signal, time delay phase shift means for shifting the phase of said split signal, and said each fiber optic means connected to a respective T/R module.

6. The system as described in claim 2, wherein each said piezo-electric crystal has a circumference around which its respective optic fiber is wrapped, said circumference being predetermined to produce stretching on the order of a wavelength of the transmitted microwave signal when an electrical control signal is applied to said crystal.

7. The phased array system as described in claim 1 wherein each said optic link comprises an optical fibre with a portion of said fibre wrapped around a said element, and said phase shift control means comprises means for enlarging each said element so as to lengthen said fibre optic link.

8. The phased array system as described in claim 1, wherein said true time delay phase shift means comprises a piezoelectric crystal in operative relation with a plurality of n fibre optic links whereby the electrical driving of said crystal introduces a phase shift of nto in each said link, where n is the number of the respective link.

9. The phased array system as described in claim 8, wherein said phase shift control means comprises means for providing a single electrical drive signal for driving said crystal.

10. An optically controlled phased array system, comprising a plurality of T/R modules positioned in a predetermined array for producing a synchronized microwave signal, each said module having means for receiving a light signal inputted thereto and for transmitting a microwave signal corresponding to such inputted light signal, light source means for generating a plurality of light signals, fiber optic link means having a plurality of fiber optic links for linking respective ones of said plurality of light signals to respective ones of said modules, time delay phase shift means including at least one electro-mechanical element for introducing a controlled time delay into the signal transmitted across each of said fiber optic links and phase shift control means for electrically driving said phase shift means, further characterized by each fiber optic link having a portion thereof physically associated with a said electro-mechanical element such that the length of each said link is stretched as a function of the control signal applied to said element by said control means thereby providing a pattern of phase shifts such as to control the propagation angle of the microwave beam delivered by said module array.

11. The system as described in claim 10, wherein said electro-mechanical element is a piezo-electric crystal.

12. A method of optically controlling a phased array antenna system, comprising
generating a plurality of synchronized light beams carrying a microwave signal,
connecting each of said light beams to a respective module of a T/R module array across a fiber optic link and producing a direction controlled microwave beam, and
controlling the length of each said fiber optic link and thus the time phase of the signal carried by each said link by mechanically associating each said link with an electro-mechanical element in a predetermined pattern and controlling the surface dimensions of each said element so that each said element introduces a respective predetermined time delay into the light beam of its associated link.

13. The method as described in claim 12, wherein said mechanically associating comprises wrapping said fiber optic link around a piezo-electric crystal.

14. The method as described in claim 12, wherein each said electro-mechanical element is a crystal of substantially identical circumference, and each said fiber link is wrapped in a predetermined number of loops around the circumference of its respective crystal.

15. The method as described in claim 14, comprising driving a plurality of said crystals by the same control voltage, whereby the phase introduced in each link wrapped around each of said plurality of crystals is proportional to the number of loops of said link.

16. An optically controlled phased array system, comprising:
light source means for generating a plurality of light beams;
array means having a plurality of modules positioned in a predetermined array, for receiving said light beams inputted thereto and for transmitting microwave signals corresponding to such inputted light beams, the sum of said microwave signals constituting a beam;
fiber optic means for providing a respective fiber optic link connecting each of said plurality of light beams to a respective module;
true time delay phase shift means for interacting with each said fiber optic link, said phase shift means having electro-mechanical means with which each said fiber optic link is associated for stretching each said link by a respective predetermined amount when said electro-mechanical means is driven; and
phase shift control mans for electrically driving said electro-mechanical means so as to introduce a respective predetermined time delay phase shift in each said link and thereby steer said beam.

17. The phased array system as described in claim 16, wherein said electro-mechanical means comprises at least one crystal having a predetermined circumference, and wherein each of a plurality of said fiber optic links is wrapped around said at least one crystal n times, where n is a respective predetermined number for each respective link, whereby driving said at least one element with a predetermined control signal introduces in each respective link wrapped there-around a phase delay which is proportional to n.

18. A phased array antenna system, having means for generating a plurality of synchronized light signals, an array of transmitting modules and fibre optic link means for connecting each of said light signals through a single optical fibre to a respective module of said array, characterized by a plurality of piezo-electric crystals, each said crystal having at least one of said optical fibres wrapped around it so that each said optical fibre is lengthened when its associated crystal is driven, and control means for driving each of said crystals so as to control the respective lengths of said optical fibres, thereby introducing a controlled time delay into each of said light signals.

19. The phased array antenna system as described in claim 18, wherein a plurality of said optical fibres are wrapped around a given one of said crystals, each of said fibres being wrapped around said one crystal a respective number of times, whereby the time delay introduced into the signal carried by each said fibre is a function of said number.

* * * * *